May 28, 1940.  S. P. CHRISTIE  2,202,087
FUEL SUPPLY CONTROL MECHANISM
Filed June 9, 1937  3 Sheets-Sheet 2

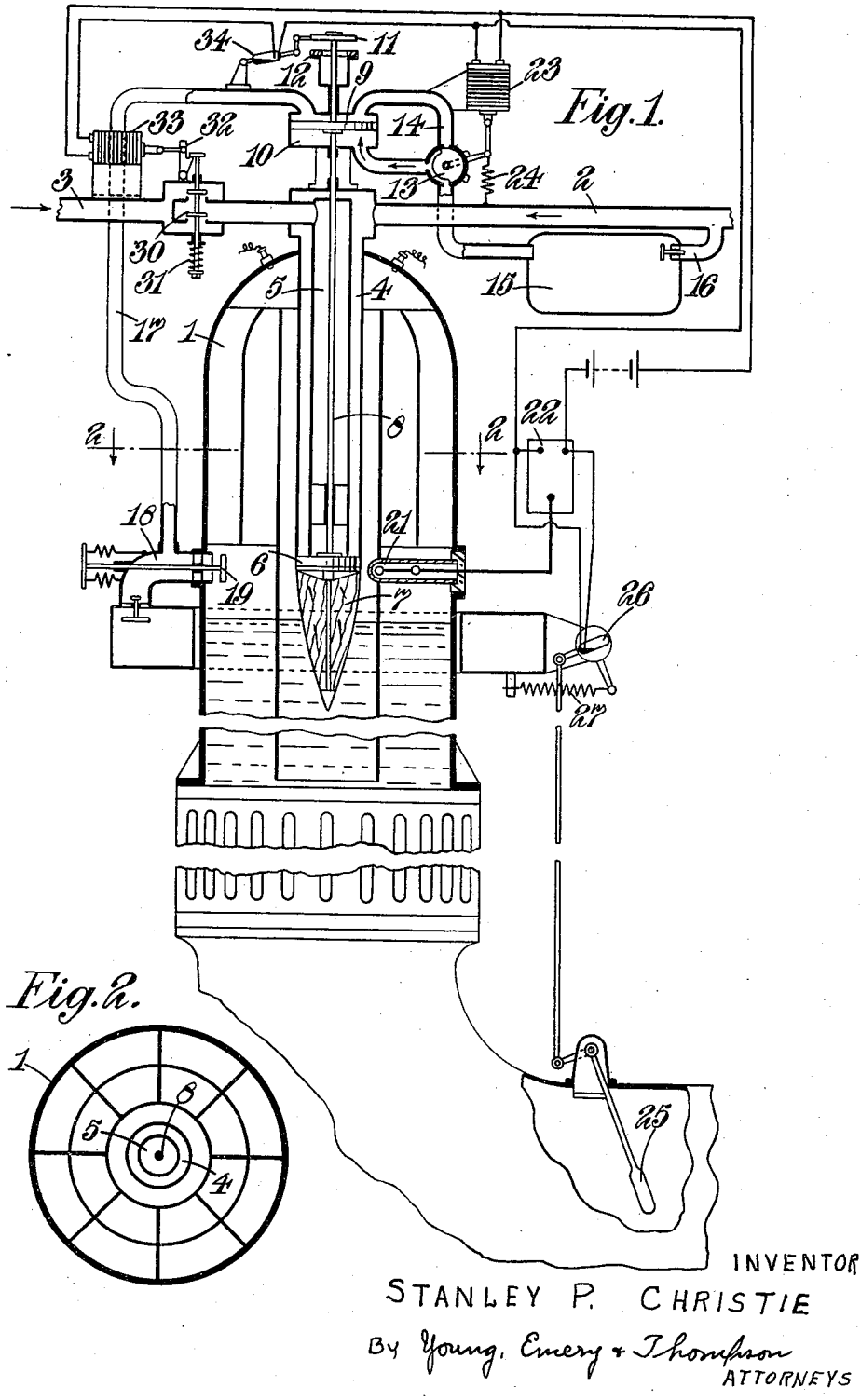

INVENTOR
STANLEY P. CHRISTIE
BY Young, Emery & Thompson
ATTORNEYS

Patented May 28, 1940

2,202,087

UNITED STATES PATENT OFFICE 2,202,087

FUEL SUPPLY CONTROL MECHANISM

Stanley Percy Christie, Sleights, England

Application June 9, 1937, Serial No. 147,388
In Great Britain June 19, 1936

4 Claims. (Cl. 123—19)

This invention consists in improvements in or relating to means for controlling the fuel supply to liquid-piston internal-combustion pumps. In such pumps the explosion gases developed on the ignition of a fuel charge within a vertical combustion chamber are allowed to act directly upon the surface of a column of liquid therein and thereby to discharge said liquid under pressure, compression of a fresh combustible charge being subsequently effected by the return of the liquid column. The invention is particularly concerned with pumps of this kind operating on the two-stroke cycle.

The admission of the fuel to the combustion chamber is normally effected through a valve (which may also admit air with the fuel), and it is an object of the present invention to provide means for preventing premature opening of the fuel admission valve and thereby to prevent the risk of premature ignition of the entering charge by the burning preceding charge. A further object is to prevent the destruction of rubber-seated valves (which are preferably employed) by burning of the mixture at the valves which may occur particularly when "forced" induction is employed, and more especially when the pump is being started up before the valves are wet.

The invention consists in an internal-combustion liquid-piston two-stroke pump having a combustion chamber provided with a fuel inlet, an exhaust system and liquid inlets and outlets and in which the admission of the fuel to the combustion chamber is controlled according to the conditions of luminosity existing in the combustion chamber from the combustion of the previous fuel charge by means of a light-responsive device.

In one form the invention comprises an internal-combustion liquid-piston two-stroke pump having a fuel admission valve characterised by the provision of a light-responsive device at a position where it will be illuminated by the light emitted by the burning of the charge within the combustion chamber, and electrical means controlled by the device for preventing (directly or indirectly) the opening, or for effecting the closing should it be open, of the fuel admission valve when the device is illuminated by the burning of the charge or of fuel passing the said valve.

Preferably the device is in the form of a light-sensitive cell and is located in the lower part of the combustion chamber and protected by a suitably toughened glass window or globe, its location being such that the protecting cover is washed by the liquid at each stroke, thereby maintaining the cell and its cover at an equable low temperature and also keeping the protective cover clean.

The cell may be arranged to control the air admission valve in addition to the fuel admission valve (when independent air and fuel valves are provided) or preferably, and particularly in self-inducing pumps, the air admission valve is free to open under the reduction of the pressure within the combustion chamber, whether or not combustion has been completed and the fuel valve allowed to open by the cell. In this way the admission of cold air may be arranged to assist in the extinction of the previous charge. In pumps where a single valve or a series of such valves is used for admitting air and fuel together the cell may be arranged to control this valve or series of valves.

The cell may be relied upon as the sole means for controlling the timing of the fuel admission valve, or it may be employed as a further control in conjunction with timing mechanism such as that described in United States Patent No. 1,824,074 or in British Specification No. 454,461. In these latter cases the cell may be arranged to operate a switch in addition to the flow or vacuum actuated control switch described in those specifications respectively, in such manner that the circuit cannot be broken or completed to allow or to effect the opening of the inlet valve until all light in the combustion chamber is extinct.

The cell may be located at any suitable position within the combustion chamber and when the chamber is provided with a spaced concentric portion the cell may be located within that portion and the electric leads to the cell carried through a tube passing through the walls of the chamber. Two or more cells may be employed if desired, for example one located in each of the concentric portions of a chamber of the above kind and arranged not to allow the fuel valve to be released so long as either cell is affected by light.

Three specific examples of pumps according to the invention will be described with reference to the accompanying diagrammatic drawings in which:

Figure 1 represents a vertical section through the combustion chamber and associated parts of one form of pump.

Figure 2 is a section of the combustion chamber on the line 2—2 of Figure 1.

Figure 3:
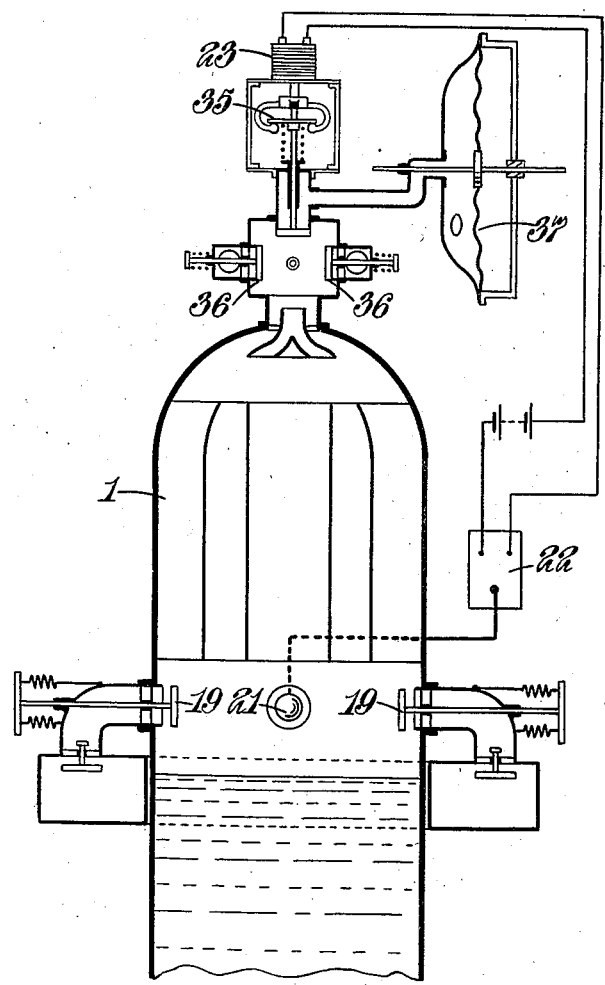
Figure 3 represents a vertical section through the combustion chamber and associated parts of another form of pump.

The pump illustrated in Figures 1 and 2 operates on the two-stroke cycle and comprises a combustion chamber 1 into which water is drawn through valved inlet openings 1a and constitutes the liquid piston and from which the water is discharged by the explosion pressure through the discharge pipe 1b. Air is supplied to the combustion chamber under a low pressure of about two and a half pounds per square inch through a pipe line 2 and gas, also under pressure, through a pipe line 3 from external compressors which are not shown. The two pipe lines 2 and 3 communicate respectively with vertical conduits 4 and 5 inside the combustion chamber. The lower ends of these conduits are closed by a rubber-faced valve 6 arranged to be floated to the closed position by the incoming liquid piston, by means of a buoyant float 7. The valve is also provided with a spindle 8 extending through the upper end of the combustion chamber and carrying a piston 9 operating in a cylinder 10 and, at its upper end, a disc 11 which comes into contact with a rubber buffer ring 12 when the valve is open. The opening of the valve is controlled by means of a two-way air valve 13 which is operated by electrical and spring means, later described, to admit air from the supply pipe 2 to the under side of the piston 9 to maintain the valve 6 in the closed position or to put both sides of the piston 9 into communication through the pipe 14 when the valve 6 is to open. In order that sufficient air pressure may always be available to maintain the valve in the closed position or to shut it when necessary, a receiver 15 having a non-return valve 16 at its inlet end is included in the air supply pipe to the valve 13. For reasons of simplicity and economy the air used to control the valve is taken from the low pressure supply to the combustion chamber and the pressure may therefore, under certain circumstances, be insufficient to prevent the opening of the valve against a high degree of vacuum inside the combustion chamber. In order to meet this point and to avoid the need for the use of air under higher pressure, a pipe 17 is arranged to connect the upper end of the cylinder 10 with the exhaust conduit 18 which is put into communication with the combustion chamber on reduction of pressure therein by the valve 19.

The operation of the valve 13 is effected under dual control. One of these controls consists in a light-sensitive cell 21 enclosed in a toughened glass tube and located at a position in the combustion chamber where it will be illuminated by any burning of the mixture at the valve 6 and by the light emanating from combustion during a normal cycle. The cell, through a suitable amplifier and relay 22, is arranged to energise a solenoid 23 so long as it is illuminated and thereby to maintain the valve 13, against the action of a spring 24, in the position shown in the drawings in which air is admitted to the under side of the piston 9. The other control consists of a paddle 25 located in the discharge pipe of the pump and arranged to be swung to the right as shown in the drawings by the discharge against a spring 27 and thereby to maintain a switch 26 in the closed position so long as the pressure due to the velocity of the discharge on the paddle is sufficient to overcome the spring 27. This switch is in parallel with the switch 22 and it is therefore necessary for both of these switches to be opened before the solenoid can release the valve 13 for it to be moved by the spring 24 into the position in which the pressure is balanced on both sides of the piston 9 and the valve 6 allowed to open.

As an additional safeguard against burning of the charge at the valve 6 a double-beat or other suitable form of valve 30 is provided in the gas pipe 3. This valve is normally maintained in the open position against a spring 31 by means of a solenoid-operated catch 32, the solenoid 33 being in the circuit controlled by the light-sensitive cell and in parallel with the solenoid 23. A further switch 34 is, however, included in the leads to the solenoid 33 and is arranged for operation by the disc 11 on the inlet valve spindle, the switch being closed only when the inlet valve is open. In normal operation therefore the solenoid 33 does not become energised because the switch 34 is only closed when the inlet valve is allowed to open by the opening of the switches 22 and 26. If, however, burning occurs at the inlet valve when it is open, the switch 34 then being closed, the switch 22 is closed by the light-sensitive cell and the solenoid 33 energised releasing the valve 30 and cutting off the gas supply until such time as the valve 30 is reset by hand.

Figure 3 illustrates the application of the invention to a self-inducing pump. In this case the light-sensitive cell 21 is arranged, so long as it is illuminated and through an amplifier and relay switch 22, to cause the solenoid 23 directly to engage a disc 35 on the fuel valve spindle and to maintain the valve in the closed position, the automatic inlet valves 36 being free to admit scavenge air when the pressure in the combustion chamber falls below atmospheric pressure. At the end of the burning of the charge the solenoid releases the fuel valve and fuel gas is induced into the combustion chamber together with further air through the valves 36 under the action of the vacuum created by the outgoing liquid. The quantity of gas induced is controlled by means of a bellows or gas bag device 37, which may be arranged also to cut off the combustion air when a desired volume of mixture has been induced.

Figure 4:
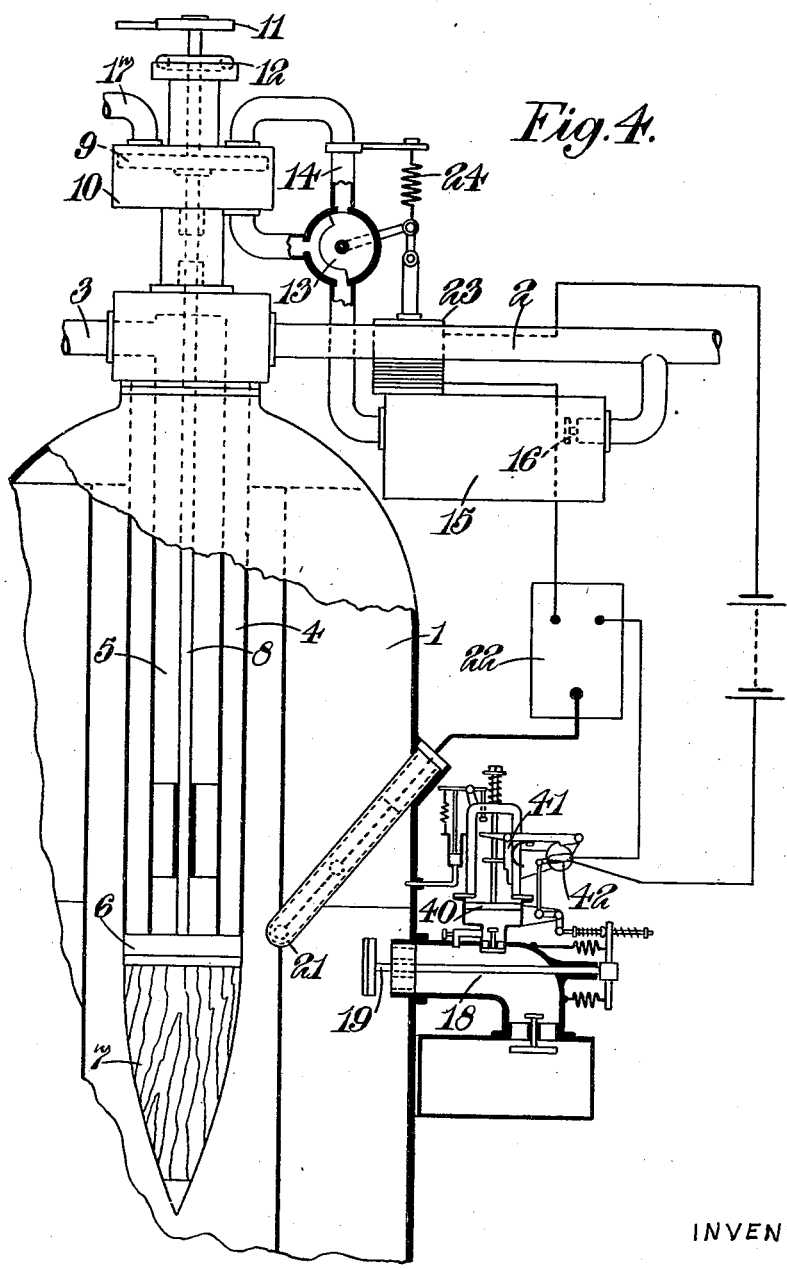
Figure 4 represents a modified form of the arrangement shown in Figures 1 and 2.

In the arrangements shown in Figures 1 and 4 air under low pressure is utilized in combination with a reduction of pressure in the combustion chamber to maintain the fuel valve in the closed position. If desired however air under higher pressure or a liquid such as oil or water under pressure may be used in place of the low pressure air in which case the use for this purpose of the reduction in pressure in the combustion chamber may be omitted.

The modified form of pump shown in Figure 4 includes a timing device on the lines described in British Specification No. 457,461 in place of the paddle control illustrated in Figures 1 and 2. In this example a spring 24 tends to maintain the two-way valve 13 in the position in which it puts the air supply into communication with the under side of the piston 9 and the solenoid 23 operates to change the position of the valve 13 when energised. The light-sensitive cell 21 operates in the manner previously described except that when the cell is illuminated it is arranged to break the circuit of the solenoid 23. The timing device is similar to that shown in Figure 2 of British Specification No. 457,461 and is so arranged that when the pressure in the combustion chamber falls below atmospheric pressure after the firing of the charge, the piston 40 moves downwardly and sets the trip 41 which is operated by the piston on its return stroke under spring action when the suction in the combustion chamber has been reduced or destroyed. The operation of the trip device permits the switch 42 to close, thereby energising the solenoid 23 to change the position of the valve 13 provided that the switch 22 has also been permitted to close by the cell 21, the switches 22 and 42 being in series. In this way the advantages of the delayed opening of the inlet valve provided by the construction described in British Specification No. 457,461 are obtained and at the same time it is impossible for the valve 6 to be opened so long as the preceding charge is still burning. Similarly, if burning at the valve 6 should take place while it is open and the switch 42 is closed, as it must be for the valve to have opened, then the illumination of the cell 21 by the combustion will cause it to break the solenoid circuit and the valve 6 to be closed by the reversal of the air valve 13 under spring 24, thereby preventing further combustion.

A separate gas cut-off valve may be included in the arrangement shown in Figure 4 in the manner described with reference to Figures 1 and 2 and indicated at 30 in those figures except that the wiring must be such that the cut-off valve is released for closing by the action which, under the control of the light-sensitive cell, breaks the main circuit and only when the inlet valve is open. Alternatively, a separate cell may be employed to control the cut-off valve.

By means of the present invention it is possible to admit the charge at the earliest safe moment in the cycle with the result that the maximum charge may be induced in a self-inducing pump without risk of back-fire and in a pressure-induced pump, when the charge is supplied under auxiliary pressure, it may enable more time to be employed for the admission of the pressure charge, thereby allowing it to be fed at a lower pressure for equal volume supplied per cycle, or, conversely, allow of a quicker rate of working. The invention also provides an additional safeguard against the possibility of back-fire, particularly in pumps of the type in which the charge is supplied under separate pressure of an auxiliary nature and admitted under a delayed action such as that described in U. S. Patent No. 1,824,074.

Liquid-piston pumps of the type with which this invention is concerned may either be used for raising liquids or for compressing elastic fluids or for effecting the propulsion of navigable vessels, and it is to be understood that the term "pump," when used herein, includes these various forms.

I claim:

1. In a liquid piston device of the character described having a play pipe and a combustion chamber provided with a fuel admission valve and an exhaust system, a light-responsive device in a position where it will be illuminated by the light emitted by the burning of a fuel charge within the combustion chamber, electrical means controlled by the light-responsive device arranged to act in a manner to tend to close the fuel admission valve when the device is so illuminated, and a second control for the timing of the opening of the fuel valve responsive to the change of flow conditions inside the play pipe and arranged to prevent the opening of the fuel admission valve until suitable pressure conditions have been attained in the combustion chamber.

2. In a device of the character described, a combustion chamber provided with a fuel admission valve and an exhaust system, a light-responsive device at a position where it will be illuminated by the light emitted by the burning of a charge within the combusion chamber, a piston and cylinder operatively connected with the fuel valve, electrically-operated valve means controlled by the light-responsive device and arranged when that device is illuminated as aforesaid to admit air under pressure to one end of the cylinder to tend to close the fuel valve and when the light-responsive device is unilluminated to put both ends of the cylinder into communication with one another to release the fuel valve for opening, and means whereby the end of the cylinder other than that to which air under pressure is admitted may be put into communication with the combustion chamber on the reduction of pressure therein to subatmospheric pressure to assist in the action tending to close the fuel valve.

3. In a device of the character described, a combustion chamber having a fuel admission valve and an exhaust system, a light-responsive device in a position where it will be illuminated by the light emitted by the burning of a fuel charge within the combustion chamber, means controlled by the light-responsive device and arranged to maintain the fuel valve closed when the device is illuminated as aforesaid, and a separate air admission valve free to open under reduction of pressure within the combustion chamber whether or not combustion has been completed and the fuel valve allowed to open.

4. In a liquid piston device of the character described provided with a combustion chamber having a fuel admission valve and an exhaust system, a light-responsive device and a toughened glass cover therefor, the device and cover being located in the lower part of the combustion chamber at a position where the device will be illuminated by the light emitted by the burning of a fuel charge within the combustion chamber and where the protecting cover will be washed by the liquid during each compression stroke, and means controlled by the light-responsive device for preventing the opening of the fuel valve when the device is illuminated as aforesaid.

STANLEY PERCY CHRISTIE.